July 1, 1930.  H. E. SMITH  1,769,240
INFLATING MEANS
Filed Aug. 27, 1927   2 Sheets-Sheet 1
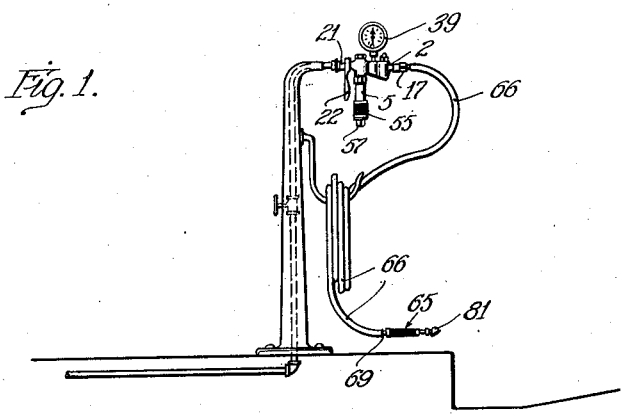
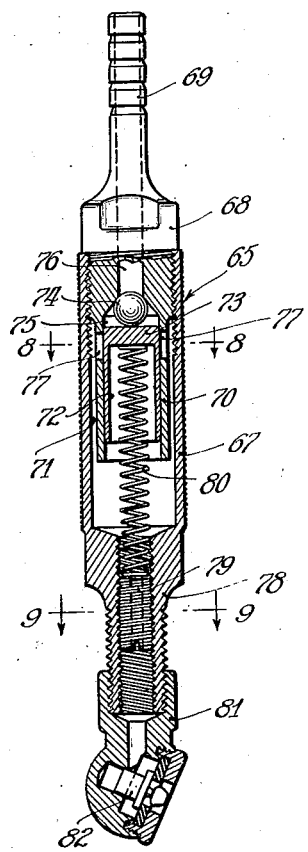
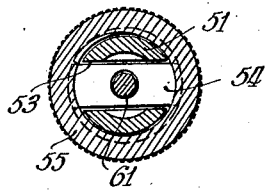
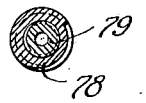
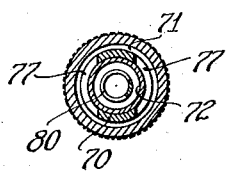
Inventor
Harvey E. Smith
By Brown, Boettcher & Diener
Atty's.

July 1, 1930.  H. E. SMITH  1,769,240
INFLATING MEANS
Filed Aug. 27, 1927  2 Sheets-Sheet 2
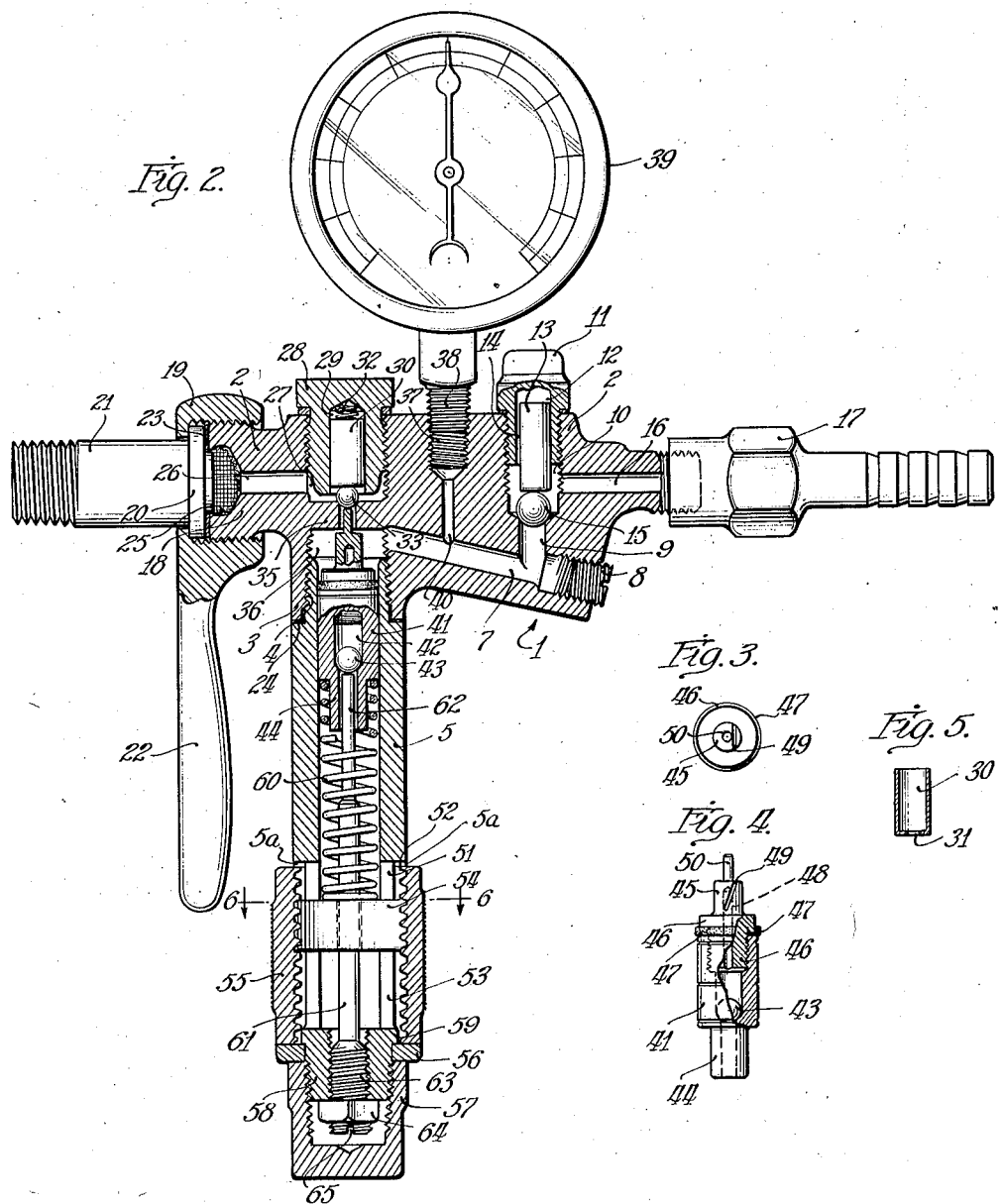
Inventor
Harvey E. Smith
By Brown, Boettcher & Dienner
Atty's Patented July 1, 1930

1,769,240

UNITED STATES PATENT OFFICE

HARVEY E. SMITH, OF PORTLAND, OREGON, ASSIGNOR TO AEROMETRIC VALVE CORP., OF PORTLAND, OREGON, A CORPORATION OF OREGON

INFLATING MEANS

Application filed August 27, 1927. Serial No. 215,987.

This invention relates to inflating means, and more particularly to means for automatically inflating automobile tires and other containers to predetermined pressures.

While devices of this general character are known, there is no device, so far as I am aware, in which a balanced piston is employed for giving the desired air pressure, this piston being responsive to the pressure in the outlet side of the device. In my apparatus, I employ balanced piston means of this character having associated therewith simple and efficient means for relieving excess pressure and to maintain the desired inflating pressure, such means being controlled in operation by the pressure in the outlet side. By this construction I avoid the use of the diaphragms or similar elements which are inclined to quickly get out of order and cause trouble. In connection with the means for regulating the pressure supplied to the outlet side I also employ a hand piece carrying the inflating chuck, this hand piece having associated therewith means for regulating the pressure delivered by the hand piece, such regulating means also serving as a signal device for indicating when inflation of the tire is complete. Further objects and advantages of my invention will appear from the detailed description.

In the drawing:—

Fig. 1 is an elevation of a regulating device and hand piece and associated parts constructed in accordance with my invention applied to an air stand of known type.

Fig. 2, is a central vertical sectional view through the pressure regulating device, parts being shown in elevation.

Fig. 3, is a plan view of the piston.

Fig. 4, is an elevation of the piston.

Fig. 5, is a longitudinal sectional view through the plunger of the inlet valve.

Fig. 6, is a section taken substantially on line 6—6 of Fig. 2.

Fig. 7, is a central longitudinal sectional view through the hand piece, parts being shown in elevation.

Fig. 8, is a section taken substantially on line 8—8 of Fig. 7.

Fig. 9, is a section taken substantially on line 9—9 of Fig. 7.

The pressure regulator includes a casing indicated in its entirety by the reference number 1. This casing has a head 2 of approximately rectangular shape from which depends a neck 3 situated adjacent one end of the head. This neck is interiorly threaded to receive the reduced interiorly threaded upper portion 4 of a cylinder 5 which is thus secured to the neck. The space 36 in the upper portion of the neck forms a pressure chamber from which extends a passage 7 closed at its outer end by a screw plug 8, this passage being inclined downwardly toward its outer end as shown. A short passage 9 establishes communication between passage 7 and a valve chamber 10 into the upper portion of which is screwed a plug nut 11. This nut is provided with a bore 12 extending from its lower end and slidably receiving a follower 13 which is preferably provided with a flat portion 14 to permit ready entry of air into the bore 12 above the follower. This follower contacts with a ball valve 15, which, when seated closes the upper end of passage 9. An outlet passage 16 extends from the valve chamber 10 to a nipple 17 which is screwed tightly onto this end of the head 2 and is corrugated for reception of the end portion of a length of suitable hose. A nipple 18 extends from the other end of the head and is exteriorly threaded for reception of a coupling member 19, which engages with flange 20 of a nipple 21, the coupling member being preferably provided with a suitable handle member 22, to facilitate manipulation thereof. This provides a union coupling between the head and the nipple 21 of such a nature that the head can be readily detached from the nipple for cleaning, repairs, or other purposes, a suitable shutoff valve being provided in the air line in advance of the nipple 21 for this purpose. To prevent air leakage a suitable gasket 23 is positioned between nipple 18 and flange 20. A gasket 24 is also disposed between the upper end of the thickened body portion of the cylinder 5 and the lower end of neck 3.

A five mesh screen 25 is provided in a suitable recess at the outer end of nipple 18, from which recess extends the air inlet passage 26. This passage opens into the lower portion of a bore 27 extending from the top of head 2, into which bore is threaded a plug nut 28. This nut is provided with a bore 29 extending from its lower end in which is loosely mounted a plunger 30. By referring to Fig. 5, it will be noted that the plunger is of hollow construction being open at its upper end and provided with an opening 31 through its lower end. An expansion coil spring 32 is mounted in the plunger 30 and is confined between the lower end thereof and the top of the nut 28. This plunger bears upon ball valve 33 so as to tend to hold the same upon its seat at the upper end of a short passage extending through web element 35 at the upper end of the neck 3. The head is also provided, between the plug nuts 11 and 28, with a threaded bore 37 which receives the tapered and threaded neck 38 of a pressure gauge 39 of known type. The bore 37 is connected at its lower end, by an air duct 40, to the air passage 7. The various air passages together with the space or pressure chamber 36, form a continuous air passage from the inlet end to the outlet end of the head but, for purposes of description, it is more convenient to refer to the various parts of this complete passage as separate passages.

A piston 41 is mounted on cylinder 5 for operation therein. This piston is provided with a bore extending to within a short distance of the lower end of the body of the piston and forming a valve chamber 42. A ball valve 43 is mounted in the chamber 42 and normally seats at the lower end thereof to close the upper end of a tubular neck 44 extending from the lower end of the piston body and providing a relief opening for escape of air for reducing the pressure in the chamber 36. The piston includes a second member 45 having a depending neck which threads into the enlarged upper portion of bore 42. This member 45 is also provided with a peripheral flange 46 which coacts with the upper end of the body of the piston to clamp a leather cup washer 47 on the piston, this washer being directed upwardly to prevent leakage of air about the piston in a known manner. Member 45 is provided with a bore 48 which opens at its lower end into the upper end of chamber 42 and with a slot 49 which intersects the upper end of bore 48. In this manner communication is established between bore 42 and the pressure chamber 36. A reduced finger 50 extends from the upper end of member 45 and is disposed to contact with and unseat the inlet valve 33 when the piston moves upwardly beyond neutral position, this finger being of less diameter than, and operating through, the passage in web element 35 with which the piston is co-axial.

Cylinder 5 is provided with a lower reduced portion 51, forming at the upper end thereof a shoulder 52. This reduced portion is provided with two longitudinally extending slots 53 disposed oppositely to each other diametrically of the cylinder. These slots receive the end portions of a cross bar 54 which extends across the cylinder. The ends of this bar project beyond the outer face of portion 51 and are threaded for engagement with an interiorly threaded sleeve 55 which is loosely mounted about portion 51 and is held against lengthwise movement by shoulder 52 and a collar 56 at the lower end of the sleeve. This collar is confined between a cap nut 57 screwed on the lower end 58 of the cylinder, this lower end 58 being reduced in diameter, and a shoulder 59 at the upper end of the reduced portion 58. A coil spring 60 has its upper portion disposed about neck 44 and is confined between the body of piston 41 and cross bar 54. By turning the sleeve 55 in the proper direction the amount of compression of spring 60 can be increased or diminished, as desired, thus varying the expansive force of the spring applied to the piston in opposition to the pressure exerted on the upper face of the piston by the air in chamber 36.

A pin 61 extends upwardly through the cross bar 54 and the spring 60 and is provided with a reduced upper portion 62 which enters neck 44, this portion of the pin being of less diameter than the diameter of the bore of the neck. At its lower end the pin is provided with an enlarged threaded element 63 which screws into the lower end portion 58 of the cylinder, which is axially bored and threaded for this purpose. The pin is secured in adjustment by a lock nut 64 threaded thereon and, preferably, the lower end of the element 63 is provided with a diametrical slot 65 for reception of the blade of a screw driver or other suitable tool. This provides simple and efficient means whereby the pin can be adjusted accurately so as to be disposed closely adjacent to the ball valve 43 when the piston is in neutral position, as illustrated in Fig. 2. This pin also serves as a retaining member to prevent displacement of the lower end of spring 60 from the upper face of the cross bar 54, and the pin also serves as a guide member for holding the cross bar against undesirable displacement. The cap nut 57, in addition to holding the stop collar 56 against downward movement also serves to cover the lock nut 64 and the lower end of the screw element 63 of the pin so as to prevent tampering therewith.

The pressure regulating device above described is intended particularly for use in connection with a hand piece 65 to which nipple 17 is connected by a suitable length of hose 66. This hand piece includes a hollow cylindrical body 67 into one end of which is fitted a member 68 provided at its outer end with a corrugated nipple 69 for reception of the hose end. This member 68 is provided with a hollow cylindrical extension 70 which projects into the body 67 of the hand piece in concentric spaced relation thereto leaving a space 71 between the extension 70 and the surrounding wall of the body. This extension is open at its outer end and receives a piston 72 operating therein, this piston being also open at its outer end and closed at its inner end by a head 73. A ball valve 74 is confined between the inner end or head 73 of the piston, and the inner end of bore 75 of extension 70, the inner portion of this bore being shaped to provide a seat for the valve 74. The inlet passage or bore 76 of the nipple member 68 opens directly into bore 75 of extension 70 and this passage is normally closed by the ball valve 74. The piston 72, when in its inner or normal position, closes two openings or slots 77 provided in the extension 70 adjacent the inner end thereof, these slots being disposed radially of the extension and establishing communication between the bore 75 and the space 71 when the piston is depressed or moved outwardly sufficiently to uncover these openings.

At its other end the hand piece is provided with a neck 78 which is axially bored and threaded for reception of a tubular screw plug 79 threaded therein and open at both ends. An expansion coil spring 80 is confined between this plug and head 73 of piston 72, this spring acting to normally hold the piston in its inner position. By adjusting the screw plug 79 in neck 78 the compression of the spring can be varied to adjust the expansive force exerted thereby on the piston. An inflating chuck 81 of known construction is threaded upon neck 78 and can be removed therefrom, when desired, for adjusting the plug 79. In using the hand piece, this chuck is applied to the end of the tire valve tube flat against the outer end thereof so as to unseat the valve 82 of the chuck permitting air to flow from the body 67 through the neck 78 and screw plug 79 into the tire.

In practice, the hollow screw plug 79 is adjusted so that the ball valve 75 is urged toward its seat with a pressure of approximately 30 pounds per square inch. I have found this additional pressure to be of value in that it insures proper operation of the piston 72 and it also insures that the air delivered from the passage 76 will enter the body 67 of the hand piece at a pressure appreciably higher than the pressure in the tire as it approaches complete inflation. This imparts a desirable velocity to the air entering the tire at such time and avoids the objectionable slowing down in inflation which takes place under the conditions referred to where means is not provided for producing this increase air velocity.

In the use of the device, the regulator is adjusted to give the desired pressure as indicated on the gauge 39. This is accomplished by turning the sleeve 55 in the proper direction. By turning this sleeve to the right the cross bar 54 is raised so as to increase the compression of spring 60 causing upward movement of the piston and consequent unseating of the inlet valve 33. As soon as this occurs air enters the pressure chamber 36 from the inlet passage so as to build up the pressure therein and in the intermediate passage 7 until the pressure exerted on the upper end of the piston is sufficient to overcome the pressure of the spring 60 to such an extent as to return the piston to neutral position, this being the position of the piston illustrated in Fig. 2. When the piston is returned to neutral position the valve 33 is seated so as to cut off the supply of air from the inlet passage. If, on the other hand, the pressure for which the device has been left set by a previous user is higher than that desired, the sleeve 55 is turned to the left lowering cross bar 54 and reducing the upward pressure exerted by spring 60. This permits downward movement of the piston 41 under the influence of the pressure exerted on the upper end thereof, causing the ball 43 to be raised by pin 61 thus permitting escape of air from chamber 36 through the piston, this air escaping into the cylinder 5 and thence to atmosphere through suitable slots 5ª provided in the cylinder at the upper end of the sleeve. As soon as sufficient air has escaped to equalize the pressure of the spring and the air above the piston, the piston is returned to neutral position by the spring and the valve 43 is again seated preventing the escape of any additional air. In either case the pressure in the passage 7 is indicated by the gauge 39. This gives simple and efficient means whereby the device can be set at the desired pressure by turning the sleeve 55 in the proper direction until the gauge indicates such pressure. In this connection attention is called to the fact that the pressure indicated by the gauge will not be the true pressure in the chamber 36 and passage 7, due to the fact that the spring 80 of the hand piece exerts a pressure of 30 pounds opposed to the pressure of the air entering the hand piece. The gauge is, therefore, properly adjusted to allow for this difference in pressure and when the gauge indicates 50 pounds pressure per square inch the actual pressure in the pressure chamber and passage 7 is 80 pounds per square inch. The gauge reading is correct, however, as to the maximum pressure which will be delivered to the tire.

Assuming that the regulator has been set for 50 pounds pressure and the inflating chuck has been applied to the valve tube of the tire:—As soon as the valve 82 of the chuck is opened air flows from the outlet passage 16 of the regulator through the hose 66 and into the tire, reducing the pressure in passage 16 relative to the pressure in passage 7. The ball valve 15 is then raised due to the greater pressure beneath the same and this results in reducing the pressure in chamber 36 causing the piston 41 to be raised so as to unseat the valve 33 admitting air from the inlet passage 26. Air then flows from the inlet passage through the chamber 36 and the passage 7 to the outlet passage 16 and thence through the hose and hand piece into the tire. When the tire is fully inflated the pressure in the outlet passage 16 and space 10 above the ball valve 15 is equal to the pressure in the passages 7 and 9 below the ball valve so that this valve is moved to seated position by gravity and by the follower 13, shutting off the supply of air to the outlet passage. This causes the pressure to build up in the chamber 36 immediately returning the piston 41 to neutral position and causing the valve 33 to be seated by the higher pressure in inlet passage 26, thus cutting off communication between this passage and the chamber 36. When the chuck is removed from the valve tube of the tire the air in the hand piece and the hose is trapped therein, due to closing of the valve 82, so as to maintain the ball valve 15 seated, this action of the trapped air being supplemented by the action of gravity on the valve and the follower 13. In Fig. 2 I have illustrated the relative positions of the valve and the piston and associated parts after the regulator has been used after being set for a pressure of 50 pounds as indicated by the gauge 39. In the event that a succeeding party desires a pressure other than 50 pounds the device is adjusted in the manner previously described for the desired pressure. If such succeeding party desires a pressure of 50 pounds no adjustment is necessary, as will be obvious.

When the chuck 81 is applied to the valve stem, valve 82 is opened permitting flow of air through the hand piece. The air flows into passage 76 and unseats the ball valve 74, and then acts upon the head 73 of piston 72 to move the piston outwardly in the extension 70 exposing the openings 77. This permits the air to escape into the space 71 and thence through the neck 78 and chuck into the tire. This sudden escape of the air from above the head 73 of the piston reduces the pressure to such an extent as to permit upward movement of the piston so as to again seat the ball valve and the pressure in passage 76 then immediately builds up so as to unseat the ball valve and again moves the piston outwardly so as to uncover the openings 77. In this manner the piston is reciprocated during inflating of the tire and the vibration caused by this reciprocation of the piston can be readily felt when holding the hand piece and, in fact, is very noticeable. As soon as the tire is fully inflated and the flow of air through the regulator is stopped in the manner above described, the piston will stop reciprocating so that the cessation of the vibration caused by the reciprocating piston is a signal which indicates that the tire is fully inflated. In addition to serving as a signal, this piston also serves, in conjunction with the spring 80, to insure that sufficient velocity will be imparted to the air entering the tire, as it approaches full inflation, to prevent slowing down of the inflating operation due to back pressure exerted by the air in the tire, as above described.

What I claim is:

1. In combination, a casing having communicating inlet and outlet passages, means responsive to the pressure in the outlet passage for controlling the flow of air under pressure through the inlet passage, an inflating hand piece connected to the outlet passage, and means carried by the hand piece for varying the pressure in the outlet passage and the pressure of the air delivered by the hand piece relative to the pressure in the inlet passage.

2. In combination, a casing having communicating inlet and outlet passages, means responsive to the pressure in the outlet passage for controlling the flow of air under pressure through the inlet passage, an inflating hand piece connected to the outlet passage, and means carried by the hand piece for varying the pressure in the outlet passage and the pressure of the air delivered by the hand piece relative to the pressure in the inlet passage, said means being adjustable to reduce the pressure of the air delivered by the hand piece relative to the pressure in the outlet passage.

3. The combination of a pressure reducing valve and a vibrating valve in series with said reducing valve having a pressure resisting element therein adapted to establish a differential between the reduced pressure and the delivered pressure.

In witness whereof, I hereunto subscribe my name this 16th day of August, 1927.

HARVEY E. SMITH.